United States Patent [19]

Kish

[11] Patent Number: 5,410,817
[45] Date of Patent: May 2, 1995

[54] MEASURING TOOL WITH CONCENTRIC POINT

[76] Inventor: William S. Kish, 14045 Heritage, Riverview, Mich. 48192

[21] Appl. No.: 63,408

[22] Filed: May 18, 1993

[51] Int. Cl.⁶ ............................................. G01B 5/20
[52] U.S. Cl. ...................................... 33/559; 33/556; 33/503
[58] Field of Search .................... 33/559, 556, 572, 503

[56] References Cited

U.S. PATENT DOCUMENTS

| | | | |
|---|---|---|---|
| 3,501,840 | 3/1970 | Schiler | 33/556 |
| 3,678,584 | 7/1972 | Dolan | 33/559 |
| 3,785,056 | 1/1974 | Schiler | 33/559 |
| 3,800,422 | 4/1974 | Schiler | 33/556 |
| 4,351,111 | 9/1982 | Carr . | |
| 4,567,672 | 2/1986 | Honda et al. | 33/559 |
| 4,612,622 | 9/1986 | May et al. . | |
| 4,807,152 | 2/1989 | Lane et al. | 33/503 |
| 4,888,877 | 12/1989 | Enderle et al. | 33/559 |
| 4,942,671 | 7/1990 | Enderle et al. | 33/559 |
| 5,014,444 | 5/1991 | Breyer | 33/559 |
| 5,088,046 | 2/1992 | McMurtry . | |

Primary Examiner—Christopher W. Fulton

[57] ABSTRACT

The measuring tool of the present invention includes an adaptor attachable to a measuring machine, a shaft extending from the adaptor and a stylus retainer for securing a stylus. The stylus which extends from the stylus retainer at an angle includes a contact head disposed along a longitudinal axis. The measuring tool which is attachable to a measuring machine is rotatable and positionable to contact virtually any point on a contoured workpiece.

16 Claims, 3 Drawing Sheets

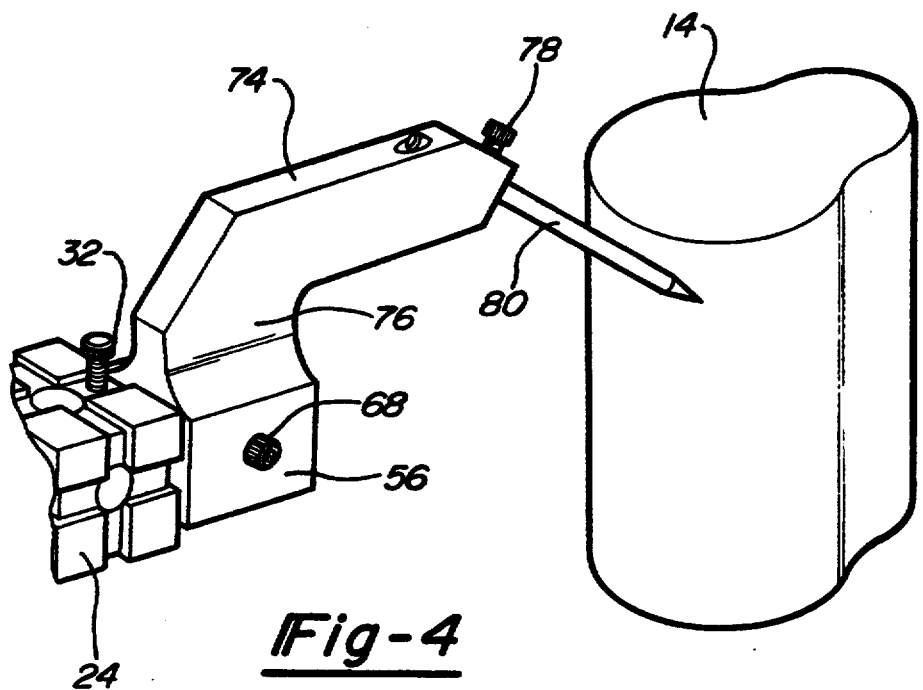
Fig-4
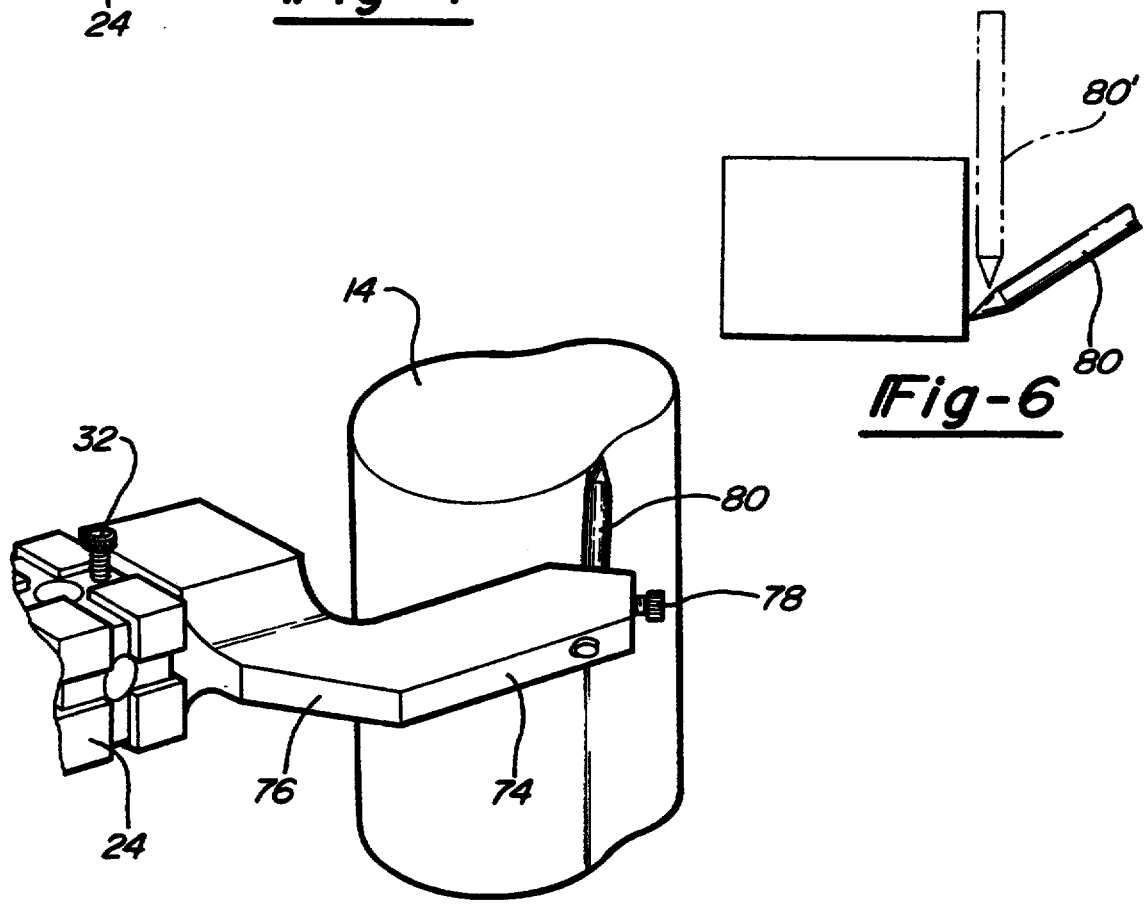
Fig-6
Fig-5

MEASURING TOOL WITH CONCENTRIC POINT

BACKGROUND OF THE INVENTION

I. Technical Field

This invention relates generally to an apparatus for measuring the area of a three dimensional configuration such as a non-planar vehicle door panel and, more particularly, to a measuring tool which is attachable to a computerized or digitalized manually operated measuring machine.

II. Discussion

In the design, development and manufacturing of a three dimensional component such as a vehicle door or body side panel it is important to measure the actual area of the entire surface, including edges and arcuate portions, to ascertain whether the component meets required specifications. Another important function, among others, is to determine specific points along the component at which work operations are to be performed. Such work operations may include drilling holes for the attachment of fasteners and a determination of points for the application of adhesives used in the manufacturing process, as well as numerous other procedures.

One mechanism which is useful in performing such measurements is a coordinate measuring machine such as the model G80C manufactured by LK, which is a Cincinnati Milicron Company. Typically, these coordinate measuring machines are movable along three axis, namely the x, y and z axis, and serve to supply a computer with information as to datum points located on the workpiece. From these datum points, a computer which is integrally connected to the coordinate measuring machine can automatically calculate surface areas and other features of the workpiece being measured.

One problem with manually operated coordinate measuring machines is that various probes are necessary to contact different points on the surface of a contoured component. For example, a linear probe is generally used to obtain datum information along planar portions of the workpiece. Then, for the contoured surfaces a second probe which has a specific shape such as an overall L-shape or a hook must be attached to the coordinate measuring machine to make contact with the contoured portions. Often a set of probes numbering five or more is needed to obtain the desired datum information from a contoured workpiece.

The use of multiple probes is time consuming in that substantial time is required to attach and detach the various probes to the coordinate measuring machine. Further, the use of multiple probes leads to inaccuracies in the readings which are taken. When a probe is attached, the coordinate measuring machine is calibrated to insure the accuracy of the readings. Each time a different probe is attached a new calibration must be conducted to help insure that consistent datum point information can be collected. This necessity of recalibrating each time an alternative measuring tool is attached also leads to the possibility of inaccurate readings and is obviously unnecessarily time consuming.

The present invention eliminates the above described problems as well as many others by providing a single measuring tool for use with a manually operated coordinate measuring machine or other such machine which is capable of contacting both planar and contoured portions of a workpiece to assist in providing datum point information in a highly accurate manner. This invention enables the operator to easily obtain datum point information over a contoured workpiece without having to reattach and substitute a variety of different probes for readings along differently shaped portions of the workpiece.

SUMMARY OF THE INVENTION

A measuring tool having a concentric contact point for use with measuring machines such as coordinate measuring machines, and more particularly, manually operated coordinate measuring machines is disclosed. The measuring tool in accordance with the teachings of the present invention includes an adaptor which is attachable to the coordinate measuring machine, a shaft extending from the adaptor, a stylus and a stylus retainer which is rotatable on the shaft which extends from the adaptor.

According to the preferred embodiment, the stylus retainer has an overall J-shape which allows the stylus to approach the work surface at an angle. The stem of the stylus is adjusted such that the sharpened contact point contained on the head of the stylus is always maintained concentrically along a central longitudinal axis. By maintaining the contact point on this longitudinal axis, the contact point serves to define point 0,0,0 according to the cartesian coordinate system.

The unique structure of the present invention allows the operator to obtain accurate datum point information along virtually any surface of the workpiece.

BRIEF DESCRIPTION OF THE DRAWINGS

These and other advantages of the present invention will become apparent to those skilled in the art after studying the following text and by reference to the drawings in which:

FIG. 4 is a side elevation view illustrating the measuring tool according to the teachings of the present invention engaging a workpiece;

FIG. 5 is a side elevation view illustrating the measuring tool rotated to engage a contoured portion of the workpiece; and FIG. 6 is an exemplary view demonstrating the difference between a stylus disposed parallel to the workpiece as in prior art embodiments and a stylus approaching from an angle according to the teachings of the present invention.

DETAILED DESCRIPTION OF THE PREFERRED EMBODIMENT

Figure 1:
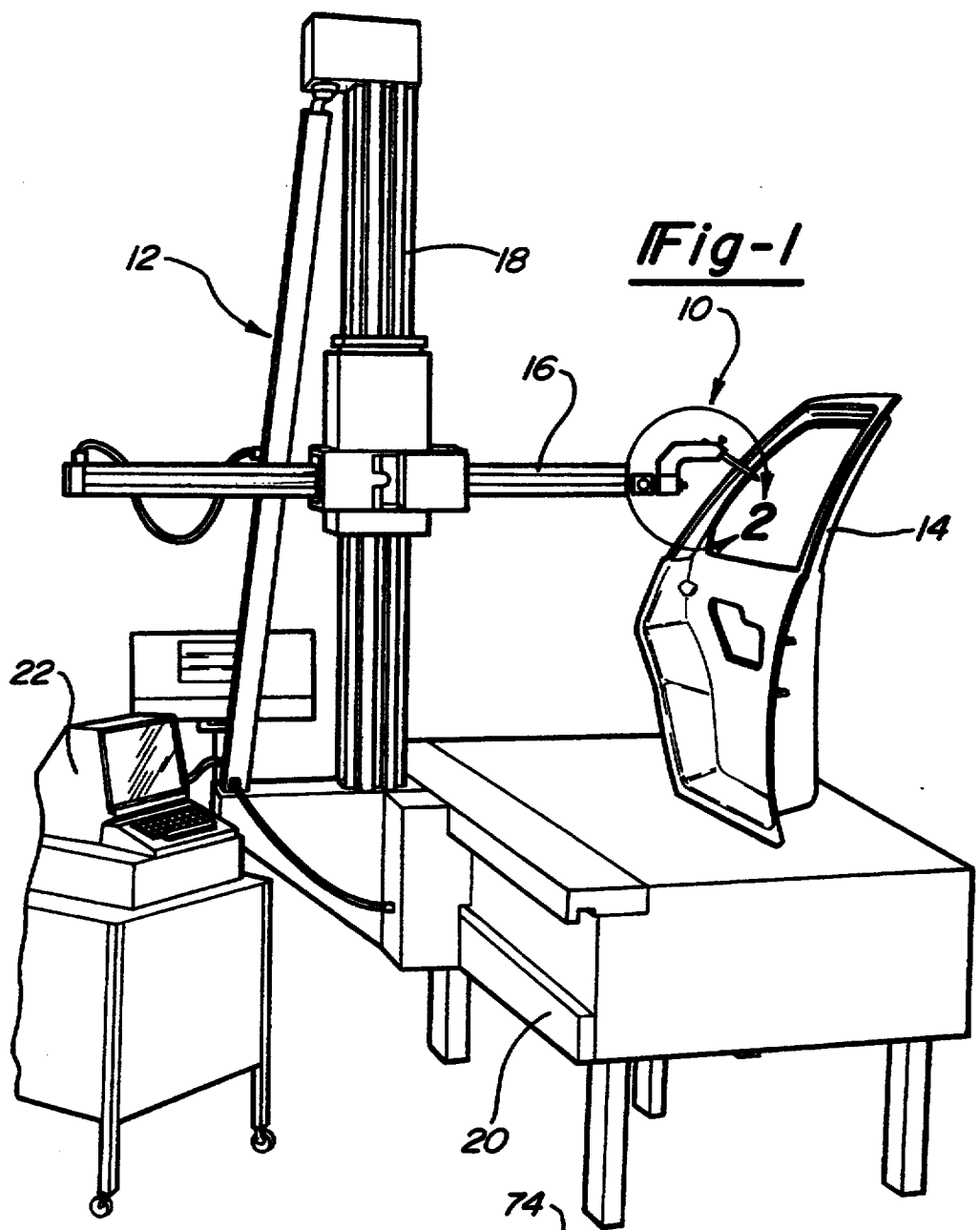
FIG. 1 is a perspective view which illustrates the measuring tool attached to a measuring machine.

FIG. 1 illustrates a measuring tool 10 attached to a measuring machine 12 and engaging a workpiece 14. The measuring machine 12, which is representative of a number of machines such as coordinate measuring machines, is typically adjustable along all three axis, namely the x, y and z axis. The measuring tool 10 can be maneuvered upwardly and downwardly by adjusting the position of the arm 16 relative to the stanchion 18. The arm itself can be maneuvered forwardly or rearwardly with respect to the position of the stanchion to engage or disengage a workpiece 14. Still further, the location of the stanchion 18 can be altered by moving the stanchion to different locations along a platform 20. This movement of the stanchion relative to the platform has the effect of moving the measuring tool from side to side.

By manually grasping the arm 16 and contacting the workpiece 14 with the measuring tool 10 readings can be obtained and information transmitted to the computer 22. The computer then processes the information obtained for later use.

Figure 2:
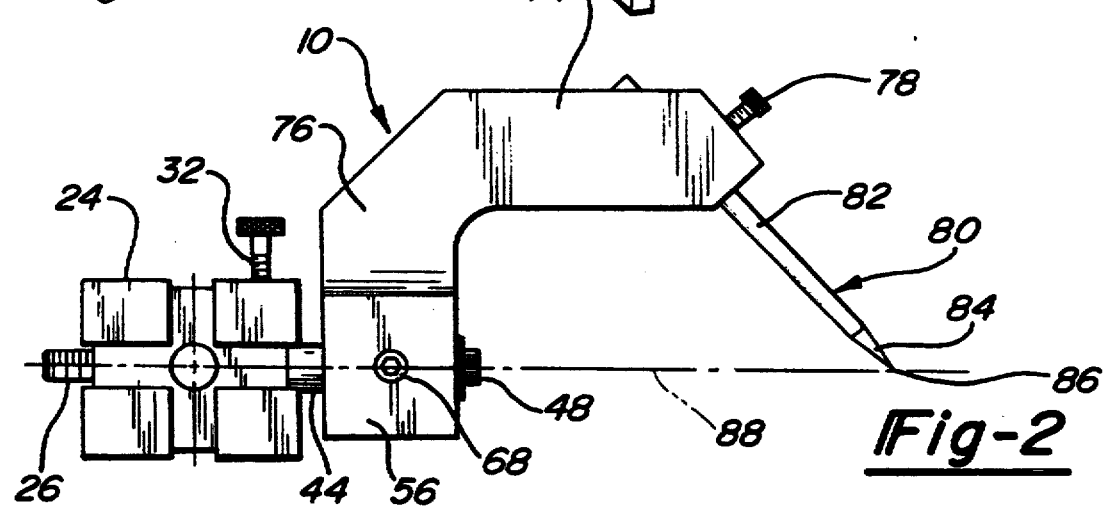
FIG. 2 is a side elevation view illustrating the measuring tool according to the teachings of the present invention.
Figure 3:
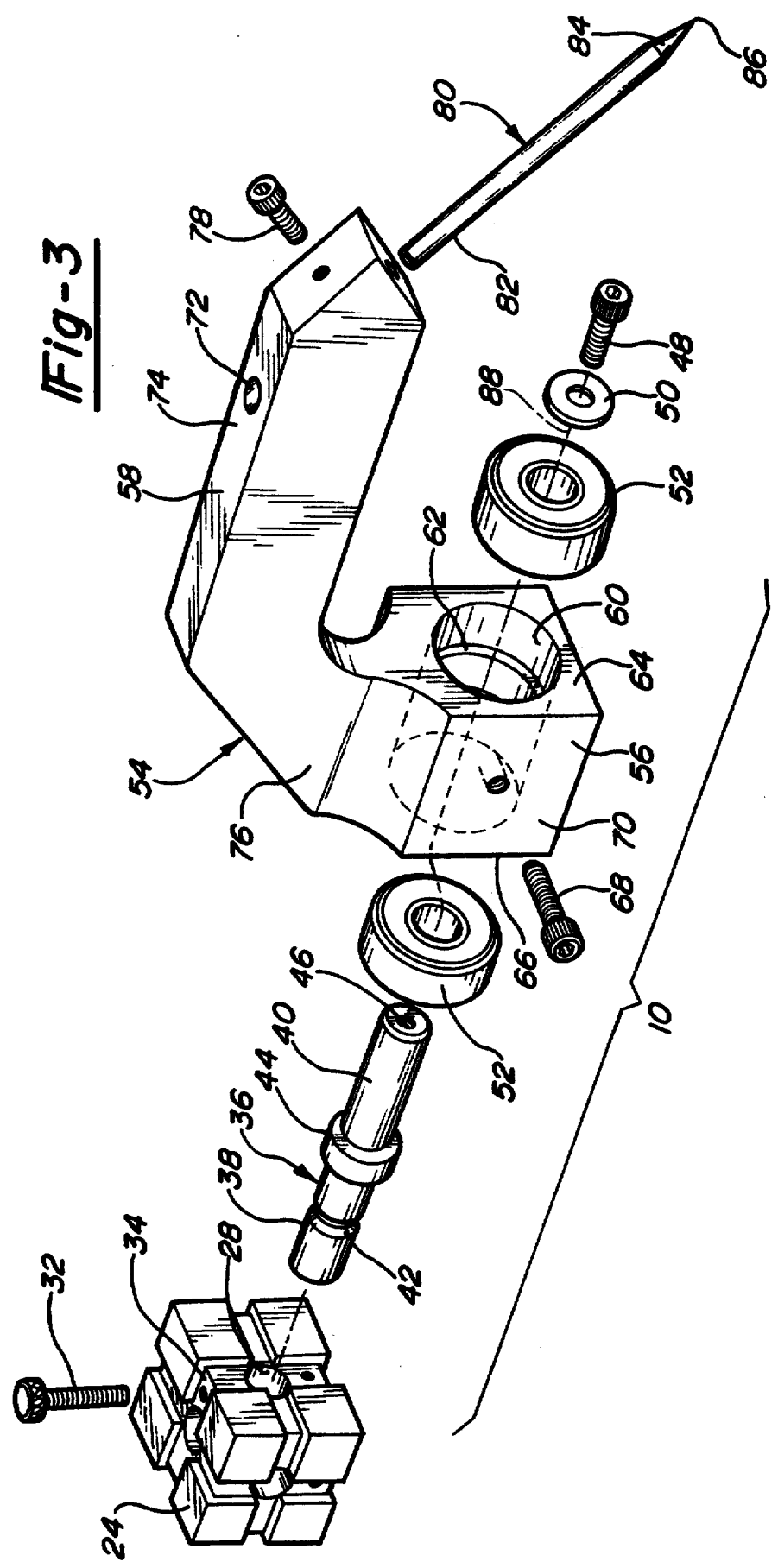
FIG. 3 is an exploded perspective view illustrating the measuring tool according to the teachings of the present invention.

Referring to FIGS. 2 and 3 measuring tool 10, according to the teachings of the present invention, is shown in more detail. Measuring tool 10 includes an adaptor 24 for attaching the measuring tool to the measuring machine 12, a shaft 36 which extends from the adaptor and is disposed linearly along a central axis 88, a stylus 80 and a stylus retainer 54 which is rotatably mounted onto the shaft. The adaptor 24 includes a fastening member 26 which is attachable to the measuring machine 12 and serves to connect the measuring tool 10 to the measuring machine 12. The fastening member 26 can be a threaded shaft, a quick connect coupling or any one of various other connecting members. The adaptor 24 also includes an axial bore 28 extending at least partially therethrough for receiving one end of the shaft. This axial bore 28 can be provided with a surface coating which will reduce the friction which results from inserting and removing the shaft from the axial bore. The adaptor 24 can come in a variety of shapes and sizes, the objective being that the adaptor is engagable by hand or by a tool for easy attachment and disconnection from the measuring machine 12. It should be understood by those skilled in the art that the diameter of the axial bore 28 can be varied to accommodate different sized shafts. Optionally, an annular sleeve (not shown) which is insertable into the axial bore 28 can be provided to size down the diameter to accommodate shafts having relatively small diameters.

The shaft 36 typically includes a first end 38 which is insertable into the axial bore 28 of the adaptor 24 and a second end 40 which supports the stylus retainer 54. The first end 38 includes a transversely disposed annular groove 42 which is engaged by a set screw 32 which extends through a wall 34 on the adaptor 24. The set screw 32 extends into the axial bore 28 and into the annular groove 42 to preclude the shaft 36 from becoming dislodged from the adaptor 24. The shaft 36 also includes an annular projection 44 separating the first and second ends, 38 and 40, respectively and serves to space the stylus retainer 54 from the adaptor 24 upon attachment to the machine 12. A threaded axial bore 46 partially extends into the shaft 36 along the second end 40 and is engagable by a bolt 48 and washer 50 assembly to lock the stylus retainer 54 over the second end 40 of the shaft 36.

One or more standard roller bearings 52 are provided to allow the stylus retainer 54 to be selectively rotated on the shaft 36. According to the preferred embodiment a pair of spaced apart roller bearings are utilized. However, it should be understood by those skilled in the art that the diameter of the shaft along both the first and second ends can be varied to accommodate different sized bearings and axial bores.

The stylus retainer 54 includes a base portion 56 and a branched arm 58 extending from the base portion 56. The base portion 56 is provided with an axially aligned bore 60 for receiving the aforementioned roller bearings 52 and the second end 40 of the shaft 36. Typically, the bearings 52 are press fit into the axial bore 60 along the first and second ends 64 and 66, respectively, of the base portion 56 to balance the load on the shaft 36. Provided within the axial bore 60 is an annular projection 62 which provides a shoulder against which each of the bearings seat. The base portion 56 further includes at least one set screw 68 which extends through a wall 70 and into the axial bore 60. Upon adjusting the set screw 68 to firmly abut the shaft 36, the stylus retainer is precluded from rotating on the shaft.

The branched arm 58 which extends from the base portion 56 has an overall J-shape and includes an aperture 72 for receiving the stylus 80. According to the preferred embodiment the aperture 72 is disposed at an angle of approximately 45° relative to the linear portion 74 of the J-shaped arm. This allows the stylus 80 to be disposed at an angle of approximately 45° from the axis shown in FIG. 3 as reference numeral 88. Again, one or more set screws 78 are provided to secure the selectively positionable stylus 80 in the desired position. The set screw 78 extends through a distal portion of the arm 58 at an angle of approximately 90° relative to the stylus. Upon tightening the set screw 78 firmly against the stem of the stylus 80, the stylus 80 is held in position within the stylus retainer 54.

The axial bore 28 of the adaptor 24, the shaft 36 and the axial bore 60 of the stylus retainer 54 are aligned along the central axis 88. In accordance with the teachings of the present invention ideally the stem 82 of stylus 80 will be adjusted and set within aperture 72 such that the sharpened point 86 of head 84 is concentric with the axis designated by reference numeral 88. By positioning the stylus 80 such that the point 86 is concentric to the axis 88 the stylus retainer 54 can be rotated on the shaft 36 without removing the point from the axis 88. In other words, when datum information is obtained by contacting the stylus 80 with the workpiece surface the point 86 always defines position (0,0,0) according to the cartesian coordinate system.

The operational aspects of the present invention will now be described in greater detail. With particular reference to FIGS. 1, 4 and 5 a workpiece 14 is positioned upon the platform 20 such that datum information can be obtained by contacting various points on the workpiece with the stylus 80. The measuring tool 10 is attached to the desired machine and an operator grasps the neck 76 of the stylus retainer 54 and advances the measuring tool 10 thereby manipulating the measuring machine. The operator then chooses various points on the workpiece at which datum information is to be collected and contacts the workpiece along those points. As the sharpened point 86 of the stylus 80 contacts the workpiece an informative signal is sent to the computer 22 where it is stored for later use. With reference to FIGS. 4 and 5 the ability to manipulate the measuring tool 10 is demonstrated. Referring to FIG. 4 the workpiece 14 is engaged by the stylus 80 from a relatively straight on advancement of the measuring tool. However, to obtain datum point information along a more contoured portion of the workpiece 14 the measuring tool 10 must be manipulated to allow the stylus 80 to contact the desired surface as shown in FIG. 5. According to the teachings of the present invention the stylus retainer 54 is rotated on the shaft 36 and the stylus 80 is advanced from the side to allow the stylus 80 to contact the workpiece. As a result of the unique structure of the stylus retainer 54 there is no interference between stylus retainer 54 and the workpiece 14 as in prior art embodiments. Datum point information can now therefore also be collected along the contoured portion of the workpiece 14.

It is important to note that by disposing the stylus at an angle of approximately 45° relative to the central axis 88 the likelihood of obtaining false or inaccurate readings is greatly reduced. As shown in FIG. 6 unlike the prior art embodiments wherein the stylus 80' shown here in phantom is disposed substantially parallel to the workpiece when contacting side surfaces, by disposing the stylus 80 at a sufficient angle the risk of contacting the workpiece with the shaft rather than the sharpened point is greatly reduced.

The versatility of the disclosed measuring tool enables the measuring machine operator to obtain datum point information from virtually any surface of a contoured workpiece. The measuring tool can generally be connected to the measuring machine both vertically and horizontally to obtain the desired readings. The measuring tool allows the datum point information to be obtained through the use of a single measuring tool. Various modifications of the disclosed measuring tool can be made without departing from the spirit and scope of the invention as set forth in the following claims.

What is claimed is:

1. A measuring tool, comprising:
   means for coupling the measuring tool to a machine;
   a selectively rotatable stylus retainer having a base portion including an axial bore and a branched arm portion extending from the base portion;
   a shaft which extends between the stylus retainer and said means for coupling the measuring tool to a machine disposed along a central axis; and
   a substantially linear stylus which extends from the stylus retainer at a 45° angle relative to the central axis, said stylus being selectively adjustable along said 45° angle and settable to terminate at the central axis such that a contact point for contacting the workpiece falls concentrically on the central axis.

2. The measuring tool of claim 1, further comprising at least one bearing disposed over said shaft and contained within the axial bore of said stylus retainer.

3. The measuring tool of claim 2, wherein a pair of roller bearings are spaced apart along one end of the shaft.

4. The measuring tool of claim 1, wherein said stylus retainer has an overall J-shape including an arcuate portion and a relatively linear portion extending substantially parallel to said central axis.

5. The measuring tool of claim 1, further comprising means for precluding rotation of said stylus retainer on said shaft.

6. The measuring tool of claim 5, wherein said means for precluding rotation of the stylus retainer includes a set screw which extends through the base portion of the stylus retainer and can be tightened to securely engage the shaft.

7. The measuring tool of claim 1, wherein the shaft further includes a first end and a second end separated by a radially outwardly extending portion for maintaining a space between said means for coupling the measuring tool to a machine and the stylus retainer.

8. The measuring tool of claim 1, further comprising means for securing a portion of the shaft within said means for coupling the measuring tool to a machine.

9. The measuring tool of claim 8, wherein said means for securing a portion of the shaft within said means for coupling the measuring tool to a machine includes an adjustable set screw which extends through said means for coupling the measuring tool to a machine, whereby the set screw is adjusted to engage an annular groove contained on the shaft.

10. A measuring tool, comprising:
    an adaptor including means for attachment to a machine extending from a first surface and means for retaining the measuring tool located along a second surface;
    a substantially J-shaped selectively rotatable stylus retainer including a base portion and a branched arm portion extending from the base portion, said branched arm including an arcuate section and a relatively linear section;
    a shaft disposed along a central axis having a first end which is coupled to the adaptor and a second end which is coupled to the stylus retainer; and
    a substantially linear stylus which extends from the linear section of said stylus retainer at a 45° angle relative to the central axis, said stylus being selectively adjustable along said 45° angle and settable to terminate at the central axis such that the contact point for contacting the workpiece falls concentrically on the central axis.

11. The measuring tool of claim 10, further comprising at least one bearing disposed over said shaft and contained within the axial bore of said stylus retainer.

12. The measuring tool of claim 11, wherein a pair of roller bearings are spaced apart along one end of the shaft.

13. The measuring tool of claim 10, further comprising means for precluding rotation of said stylus retainer on said shaft.

14. The measuring tool of claim 13, wherein said means for precluding rotation of the stylus retainer includes a set screw which extends through the base portion of the stylus retainer and can be tightened to securely engage the shaft.

15. The measuring tool of claim 10, wherein the shaft further includes a first end and a second end separated by a radially outwardly extending portion, said second end further including an annular groove.

16. A measuring tool comprising:
    an adaptor including means for attachment to a machine extending from a first surface, said adaptor including axial bore extending at least partially therethrough;
    a substantially J-shaped selectively rotatable stylus retainer including a base portion having an axial bore therethrough and a branched arm portion extending from the base portion, said branched arm including an arcuate section and a relatively linear section;
    shaft disposed along a central axis by a first end which extends into the axial bore of the adaptor and a second end which extends into the axial bore of the stylus retainer;
    at least one bearing disposed over said shaft and contained within the axial bore of the stylus retainer; and
    a substantially linear stylus which extends from the linear section of the stylus retainer at a 45° angle relative to the central axis, said stylus being selectively adjustable along said 45° angle including a stem portion and a head portion having a contact point;
    whereby the stylus is selectively secured by a stylus retainer such that the contact point can be maintained concentrically along the central axis.

* * * * *

UNITED STATES PATENT AND TRADEMARK OFFICE
CERTIFICATE OF CORRECTION

PATENT NO. : 5,410,817
DATED : May 2, 1995
INVENTOR(S) : William S. Kish

It is certified that error appears in the above-indentified patent and that said Letters Patent is hereby corrected as shown below:

On the title page: Item [73] Assignee: should read --The Budd Company; Troy, Michigan --.
   Item [56]
Attorney, Agent or Firm, should read --Harness, Dickey & Pierce, P.L.C.--.

Column 2, line 26, "cartesian" should be --Cartesian --.
Column 4, line 40, "cartesian" should be --Cartesian --.

Signed and Sealed this

Eighteenth Day of July, 1995

Attest:

BRUCE LEHMAN

*Attesting Officer*          *Commissioner of Patents and Trademarks*